(12) United States Patent
Pierre

(10) Patent No.: US 10,361,419 B2
(45) Date of Patent: Jul. 23, 2019

(54) SUBMARINE PROVIDED WITH ROWS OF POWER STORAGE MEANS

(71) Applicant: DCNS, Paris (FR)

(72) Inventor: Nicolas Pierre, Quimper (FR)

(73) Assignee: NAVAL GROUP, Paris (FR)

( * ) Notice: Subject to any disclaimer, the term of this patent is extended or adjusted under 35 U.S.C. 154(b) by 136 days.

(21) Appl. No.: 15/511,113

(22) PCT Filed: Jul. 23, 2015

(86) PCT No.: PCT/EP2015/066945
§ 371 (c)(1),
(2) Date: Mar. 14, 2017

(87) PCT Pub. No.: WO2016/041668
PCT Pub. Date: Mar. 24, 2016

(65) Prior Publication Data
US 2017/0256772 A1    Sep. 7, 2017

(30) Foreign Application Priority Data

Sep. 15, 2014 (FR) ..................... 14 02045

(51) Int. Cl.
*H01R 11/01* (2006.01)
*H01M 10/0525* (2010.01)
(Continued)

(52) U.S. Cl.
CPC ............ *H01M 2/206* (2013.01); *B60L 50/64* (2019.02); *B63G 8/08* (2013.01); *H01M 2/1077* (2013.01); *H01M 10/0525* (2013.01); *H01M 10/425* (2013.01); *H01M 10/482* (2013.01); *H01R 11/01* (2013.01); *B60L 2200/32* (2013.01); *H01M 2220/20* (2013.01); *Y02T 10/705* (2013.01); *Y02T 10/7011* (2013.01)

(58) Field of Classification Search
CPC .... B63G 8/08; B60L 11/1879; B60L 2200/32; Y02T 10/7011; Y02T 10/705; H01M 10/0525; H01M 10/425; H01M 10/482; H01M 2/1077; H01M 2/206; H01M 2220/20; H01R 11/01
See application file for complete search history.

(56) References Cited

FOREIGN PATENT DOCUMENTS

EP      1 641 066 A2    3/2006

OTHER PUBLICATIONS

International Search Report, dated Oct. 9, 2015, from corresponding PCT application.

(Continued)

*Primary Examiner* — Brittany L Raymond
(74) *Attorney, Agent, or Firm* — Young & Thompson

(57) ABSTRACT

Disclosed is a submarine provided with lithium-ion battery-based electricity storage, assuming the form of associated individual storage elements (2, 3, 4), each element (2, 3, 4) being provided with an electronic connecting and operation management card (5, 6, 7), in which: the associated individual storage elements (2, 3, 4) are arranged in a row; each electronic card (5, 6, 7) of an element of a row (1) is mechanically and electrically connected, at its ends (8, 9), to the electronic cards (5, 6, 7) of the row (1) that are its closest neighbors, to form a strip of cards (1a) for this row (1); this strip of cards (1a) can be manipulated by an operator from at least one of its ends and is able to slide relative to the storage elements (2, 3, 4) of the row (1).

12 Claims, 1 Drawing Sheet

Figure 1:
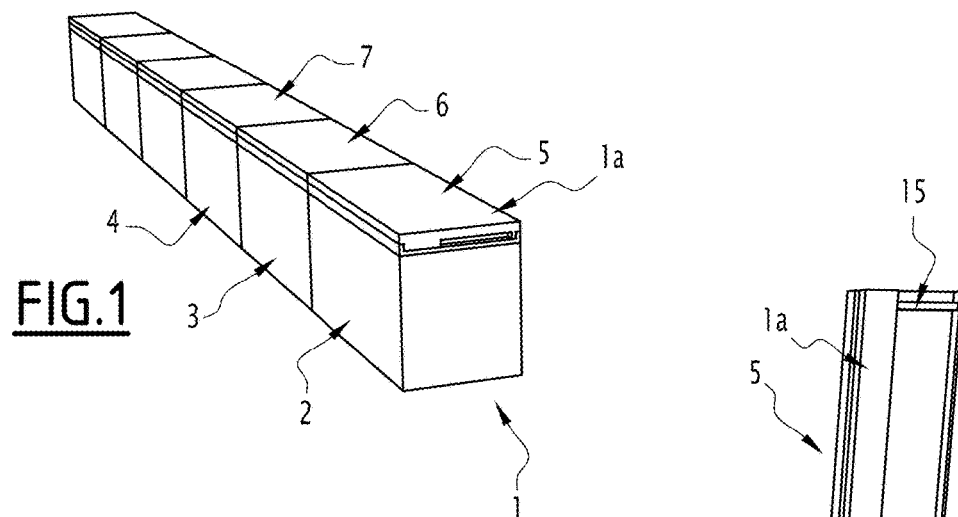

(51) Int. Cl.
*B63G 8/08* (2006.01)
*B60L 11/18* (2006.01)
*H01M 2/20* (2006.01)
*H01M 10/48* (2006.01)
*H01M 2/10* (2006.01)
*H01M 10/42* (2006.01)
*B60L 50/64* (2019.01)

(56) References Cited

OTHER PUBLICATIONS

FR Search Report, dated Jun. 9, 2015, from corresponding FR application.

SUBMARINE PROVIDED WITH ROWS OF POWER STORAGE MEANS

The present invention relates to an underwater vehicle such as a submarine strictly speaking.

These types of underwater vehicles are provided with electrical propulsion means powered from a power grid generally divided into edges.

These types of underwater vehicles also have a large quantity of DC power storage sources on board.

Due to their low mass, lithium-ion batteries make it possible to consider manufacturing very large-capacity batteries.

With the aim of gaining installation density and benefiting fully from the technological advances procured by these lithium-ion batteries, the battery modules must be stacked next to one another or on one another as much as possible, which may pose access problems either to the batteries themselves, or to the electronic cards for managing their operation, situated as close as possible to the battery modules so as to limit the number of wires and therefore risks of short-circuit.

The electronic cards in fact being likely to break down more regularly than the battery modules as such, made up solely of storage cells and connector technology, it is interesting to be able to access these cards easily to change them quickly without disassembling several modules.

The invention therefore aims to resolve these problems.

To that end, the invention relates to a submarine provided with lithium-ion battery-based electricity storage means, assuming the form of associated individual storage elements, each element being provided with an electronic connecting and operation management card, in which:
the associated individual storage elements are arranged in a row,
each electronic card of an element of a row is mechanically and electrically connected, at its ends, to the electronic cards of the row that are its closest neighbors, to form a strip of cards for this row,
this strip of cards can be manipulated by an operator from at least one of its ends and is able to slide relative to the storage elements of the row.

According to other features considered alone or in combination, the underwater vehicle according to the invention may also have one or more of the following features:
the electronic cards and the storage elements of a row include complimentary electrical connecting means offset from one another in the direction of the width of these electronic cards and elements;
the position of the complementary connecting means is configurable depending on the position of the element in the row;
a strip of cards of a row is mounted to be movable by sliding in rails provided on each side of the storage elements.

Figure 2:
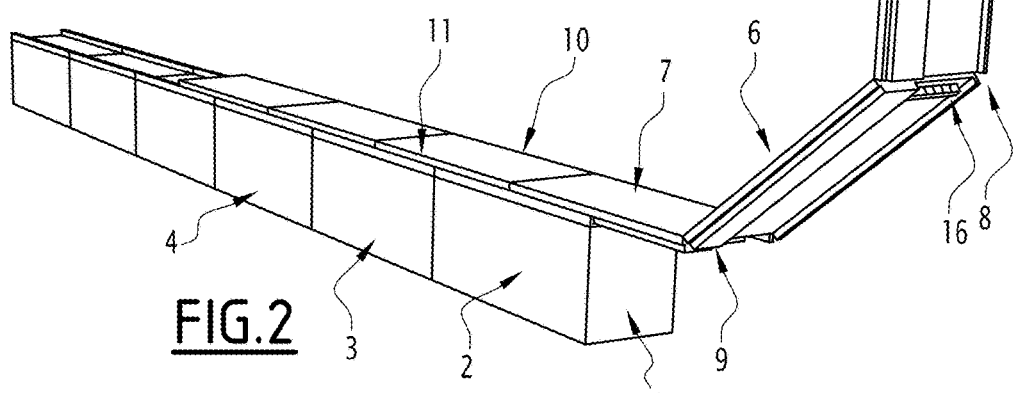
Figure 3:
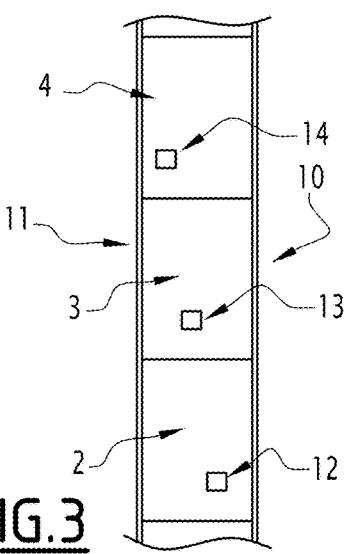
Figure 4:
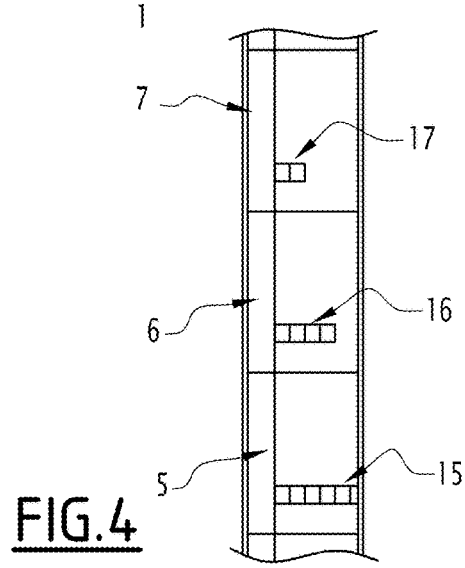

The invention will be better understood using the following description, provided solely as an example and done in reference to the appended drawings, in which:

FIGS. 1 and 2 show a row of lithium-ion batteries including storage elements and electronic cards according to the invention, FIG. 3 shows a top view of the storage elements of FIG. 1, and FIG. 4 shows a bottom view of the electronic cards of FIG. 1.

The figures, and in particular in FIGS. 1 and 2, show lithium-ion battery-based electricity storage means, able to be included in the composition of an underwater vehicle according to the invention.

This underwater vehicle is for example formed by a submarine strictly speaking.

These electricity storage means assume the form of individual storage elements each provided with an electronic connecting and operation management card.

Thus for example in these FIGS. 1 and 2, a row 1 of individual electricity storage elements 2, 3, 4 is illustrated, each respectively bearing an electronic connecting and operation management card 5, 6, 7.

These cards are for example positioned on the upper face of the storage elements 2, 3, 4.

Traditionally, these electronic cards 5, 6, 7 make it possible to connect storage elements 2, 3, 4 to the rest of the circuits of the underwater vehicle and to manage the operation of these storage elements 2, 3, 4.

These electronic cards 5, 6, 7 then include electronic connecting circuits, for example connecting studs intended to cooperate with complementary studs of the individual storage elements 2, 3, 4.

To resolve the various aforementioned problems, in order to stack the battery modules as much as possible, while allowing easy access to these modules in the corresponding cards, in the vehicle according to the invention, the individual storage elements 2, 3, 4 are arranged in a row.

Furthermore, each electronic card 5, 6, 7 of an element 2, 3, 4 of a row is mechanically and electrically connected to its neighbors to form, as illustrated in these FIGS. 1 and 2, a strip of cards for this row 1.

This strip of cards can then be manipulated by an operator from at least one of its ends by sliding relative to the storage elements 2, 3, 4 of the row.

Thus, as shown in FIG. 2, the storage elements 2, 3, 4 are positioned on the row 1, the corresponding electronic cards 5, 6, 7 being connected to one another at their ends 8, 9, for example, so as to form a strip of cards 1a for this row 1.

This strip of cards 1a is then mounted sliding on the set of storage elements 2, 3, 4 of the row 1 for example owing to guide rails, for example the rails 10, 11 provided on each side of the storage elements 2, 3, 4.

Once these elements are aligned, the rails of these elements are then also aligned relative to one another, to receive the corresponding edges of the strip of cards 1a.

One can then see that when an operator wishes to access the electronic cards of a row, he needs only grasp one of the ends of the strip of cards 1a corresponding to the row and pull this strip of cards in order to free it from the associated storage elements of the row.

Advantageously, the storage elements and the associated electronic cards comprise complementary connecting means or members to exchange information.

These complementary members are for example connectors for the storage elements and connecting members for the electronic cards.

Thus, each storage element includes a connector able to recover and send information regarding the storage element with which it is associated, in particular information on the potential across the terminals of the storage element.

Three connectors 12, 13, 14 respectively corresponding to the storage elements 2, 3, 4 are for example illustrated in FIG. 3.

The card corresponding to a storage element then comprises a connecting member able to be connected to the connector of the associated storage element.

For example and as shown in FIG. 4, the electronic cards 5, 6, 7 associated with the storage elements 2, 3, 4 comprise electrical connecting members 15, 16, 17, these members 15, 16, 17 respectively being able to be connected to the connectors 12, 13, 14 of the storage elements 2, 3, 4 as illustrated in FIG. 3.

As illustrated in these FIGS. 3 and 4, the connectors 12, 13, 14 are offset relative to one another in the direction of the width of the storage elements 2, 3, 4.

The connecting members 15, 16, 17 are also offset relative to one another in the direction of the width of the cards, such that these members 15, 16, 17 are still respectively able to be connected to the connectors 12, 13, 14.

This configuration enables the electronic cards 5, 6, 7 to slide on the storage elements 2, 3, 4 without risking abutting on the connectors 12, 13, 14 when an operator slides the strip of cards 1a of the row 1, for example.

Of course, this arrangement of the complementary connecting means is adjustable and configurable depending on the position of the corresponding storage element in the row.

One can thus see that such a structure has a certain number of advantages, in particular in terms of the manipulation and upkeep of these batteries.

The invention claimed is:

1. A submarine provided with lithium-ion battery-based electricity storage means comprising associated individual storage elements, each associated individual storage element being provided with an electronic card, each electronic card being a connecting and operation management card, each of the electronic cards being positioned on an upper face of an individual one of the associated individual storage elements, wherein,
the associated individual storage elements are arranged in a row,
each electronic card is provided to the individual one of the associated individual elements of the row is mechanically and electrically connected, at ends of the concerned electronic card, to the electronic cards of the row that are adjacent to the concerned electronic card, to form a strip of the electronic cards for the row, the strip of the electronic cards having a first strip end and an opposite second strip end,
each electronic card including connecting studs intended that cooperate with complementary studs of individual one of the associated individual storage elements,
the strip of the electronic cards can be manipulated by an operator from at least one of first and second strip ends and the strip of the electronic cards is able to slide relative to the storage elements of the row.

2. The submarine according to claim 1, wherein,
the electronic cards and the associated individual storage elements of the row include complementary electrical connecting means,
the electrical connecting means of the associated individual storage elements being connectors,
the electrical connecting means of the electronic cards being connecting members,
for each electronic card, the connectors are able to recover and send information regarding the individual one of the individual storage elements to which the electronic card is provided,
the electrical connecting means of the electronic cards are offset from one another in a direction of a width of the electronic cards, considered relative to the strip of the electronic cards, and
the electrical connecting means of the associated individual storage elements are offset from one another in the direction of the width of the associated individual storage elements, considered relative to the row.

3. The submarine according to claim 2, wherein the position of the complementary connecting means is configurable depending on the position of the element in the row.

4. The submarine according to claim 3, wherein the strip of electronic cards of the row is mounted to be movable by sliding in two rails provided on two respective sides of the associated individual storage elements.

5. The submarine according to claim 2, wherein the strip of electronic cards of the row is mounted to be movable by sliding in two rails provided on two respective sides of the associated individual storage elements.

6. The submarine according to claim 1, wherein the strip of electronic cards of the row is mounted to be movable by sliding in two rails provided on two respective sides of the associated individual storage elements.

7. A submarine comprising:
a set of storage elements arranged as a row of storage elements, each of the storage elements comprising an individual lithium-ion battery, the set of storage elements including a first storage element, a second storage element, a third storage element, and a fourth storage element, the first, second, third, and fourth storage elements being arranged in the row of storage elements; and
a set of electronic connecting and operation management cards that form an electronic connecting and operation management card strip,
each of the electronic connecting and operation management cards having a first end and an opposite second end,
the first end of each of the electronic connecting and operation management cards being electrically and mechanically connectable to the second end of each of the other electronic connecting and operation management cards,
the set of electronic connecting and operation management cards including a first electronic connecting and operation management card, a second electronic connecting and operation management card, a third electronic connecting and operation management card, and a fourth electronic connecting and operation management card,
an upper face of each storage element bearing a respective one of the electronic connecting and operation management cards, with the upper face of the first storage element bearing the first electronic connecting and operation management card, the upper face of the second storage element bearing the second electronic connecting and operation management card, the upper face of the third storage element bearing the third electronic connecting and operation management card, and the upper face of the fourth storage element bearing the fourth electronic connecting and operation management card,
the second end of the first electronic connecting and operation management card being mechanically and electrically connected to the first end of the second electronic connecting and operation management card,
the second end of the second electronic connecting and operation management card being mechanically and electrically connected to the first end of the third electronic connecting and operation management card,
the second end of the third electronic connecting and operation management card being mechanically and electrically connected to the first end of the fourth electronic connecting and operation management card, the electronic connecting and operation management card strip having a first strip end and an opposite second strip end, each electronic connecting and operation management card comprising connecting studs that cooperate with complementary studs of each of the storage elements, where the complementary studs of each of the storage elements electrically connect to the connecting studs of the respective one of the electronic connecting and operation management cards borne by each of the storage elements, wherein the electronic connecting and operation management card strip can be manipulated by an operator from at least one of first strip end and the second strip end by sliding the electronic connecting and operation management card strip relative to the row of storage elements.

8. The submarine according to claim 7, wherein, the electronic connecting and operation management cards and the storage elements include complementary electrical connecting means, the electrical connecting means of the storage elements being connectors, the electrical connecting means of the electronic connecting and operation management card being connecting members, for each electronic connecting and operation management card, the connectors are able to recover and send information regarding the respective one of the storage elements bearing the electronic connecting and operation management card, the electrical connecting means of the electronic connecting and operation management cards are offset from one another in a direction of a width of the electronic cards, considered relative to a length of the electronic connecting and operation management card strip, and the electrical connecting means of the storage elements are offset from one another in the direction of the width of the storage elements, considered relative to a length of the row of storage elements.

9. The submarine according to claim 8, wherein the position of the complementary connecting means is configurable depending on the position of the storage element in the row.

10. The submarine according to claim 9, wherein each storage element further comprises two rails located on two respective sides of each storage element, the two rails of the storage elements in the row of storage elements receiving corresponding edges of the electronic connecting and operation management card strip, with the electronic connecting and operation management card strip being slidable in the two rails of the storage elements in the row of storage elements by the operator grasping at least one of first and second strip ends and the strip of the electronic cards to slide the strip of the electronic cards within the two rails relative to the storage elements of the row.

11. The submarine according to claim 8, wherein each storage element further comprises two rails located on two respective sides of each storage element, the two rails of the storage elements in the row of storage elements receiving corresponding edges of the electronic connecting and operation management card strip, with the electronic connecting and operation management card strip being slidable in the two rails of the storage elements in the row of storage elements by the operator grasping at least one of first and second strip ends and the strip of the electronic cards to slide the strip of the electronic cards within the two rails relative to the storage elements of the row.

12. The submarine according to claim 7, wherein each storage element further comprises two rails located on two respective sides of each storage element, the two rails of the storage elements in the row of storage elements receiving corresponding edges of the electronic connecting and operation management card strip, with the electronic connecting and operation management card strip being slidable in the two rails of the storage elements in the row of storage elements by the operator grasping at least one of first and second strip ends and the strip of the electronic cards to slide the strip of the electronic cards within the two rails relative to the storage elements of the row.

* * * * *